United States Patent
Ravichandran et al.

(10) Patent No.: US 12,071,120 B2
(45) Date of Patent: Aug. 27, 2024

(54) METHODS AND SYSTEM TO PREPARE A DISCONNECT CLUTCH FOR STARTING AN ENGINE

(71) Applicant: Ford Global Technologies, LLC, Dearborn, MI (US)

(72) Inventors: Maruthi Thiruninravur Ravichandran, Dearborn, MI (US); Marin Assaliyski, Dearborn, MI (US); Akshay Bichkar, Ann Arbor, MI (US); Karthik Pillutla, Detroit, MI (US); Rajit Johri, San Francisco, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/450,583

(22) Filed: Aug. 16, 2023

(65) Prior Publication Data
US 2023/0391309 A1    Dec. 7, 2023

Related U.S. Application Data

(62) Division of application No. 17/547,121, filed on Dec. 9, 2021, now Pat. No. 11,772,627.

(51) Int. Cl.
*B60W 10/06*    (2006.01)
*B60W 10/02*    (2006.01)
(Continued)

(52) U.S. Cl.
CPC .......... *B60W 10/023* (2013.01); *B60W 10/06* (2013.01); *B60W 10/08* (2013.01); *B60W 30/182* (2013.01); *B60W 2510/06* (2013.01); *B60W 2510/0604* (2013.01); *B60W 2520/10* (2013.01); *B60W 2530/13* (2021.08); *B60W 2540/10* (2013.01); *B60W 2556/10* (2020.02);
(Continued)

(58) Field of Classification Search
CPC .... B60W 10/023; B60W 10/06; B60W 10/08; B60W 10/02; B60W 30/182; B60W 20/10; B60W 2510/06; B60W 2540/10; B60W 2710/021; B60W 2710/06; B60W 2556/10; B60W 2510/0604; B60W 2530/13; B60W 2540/103; B60W 2556/65
USPC .............................................. 477/5; 701/113
See application file for complete search history.

(56) References Cited

U.S. PATENT DOCUMENTS 5,111,718 A    5/1992  Iizuka
5,458,545 A    10/1995 Adam et al.
(Continued)

FOREIGN PATENT DOCUMENTS

GB    2496982 A    5/2014
WO    2021198342 A1    10/2021

OTHER PUBLICATIONS

Ravichandran, M. et al., "Methods and System for Starting an Engine," U.S. Appl. No. 17/443,925, filed Jul. 28, 2021, 35 pages.

*Primary Examiner* — Roger L Pang
(74) *Attorney, Agent, or Firm* — David Kelley; McCoy Russell LLP

(57) ABSTRACT

Systems and methods for starting an engine of a hybrid vehicle are described. In one example, the method starts an engine according to vehicle conditions that are within a range that is defined by one or more thresholds. The thresholds may be adjusted based on a history of individual driving patterns.

5 Claims, 7 Drawing Sheets

(51) Int. Cl.
  *B60W 10/08*      (2006.01)
  *B60W 30/182*     (2020.01)

(52) U.S. Cl.
  CPC ... *B60W 2710/021* (2013.01); *B60W 2710/06* (2013.01); *B60W 2710/0644* (2013.01)

(56) References Cited

U.S. PATENT DOCUMENTS

| | | |
|---|---|---|
| 9,039,570 B2 | 5/2015 | Doering et al. |
| 9,108,614 B2 | 8/2015 | Doering et al. |
| 9,896,088 B2 | 2/2018 | Miyagawa et al. |
| 10,408,183 B2* | 9/2019 | Leone .................. F02N 11/0851 |
| 11,285,960 B2 | 3/2022 | Blue et al. |
| 11,300,091 B2* | 4/2022 | Rollinger ............ F02N 11/0811 |
| 2014/0365057 A1* | 12/2014 | Arita ....................... F02D 29/02 |
| | | 903/903 |
| 2015/0292465 A1* | 10/2015 | Wright ................. F02N 11/108 |
| | | 903/905 |

* cited by examiner

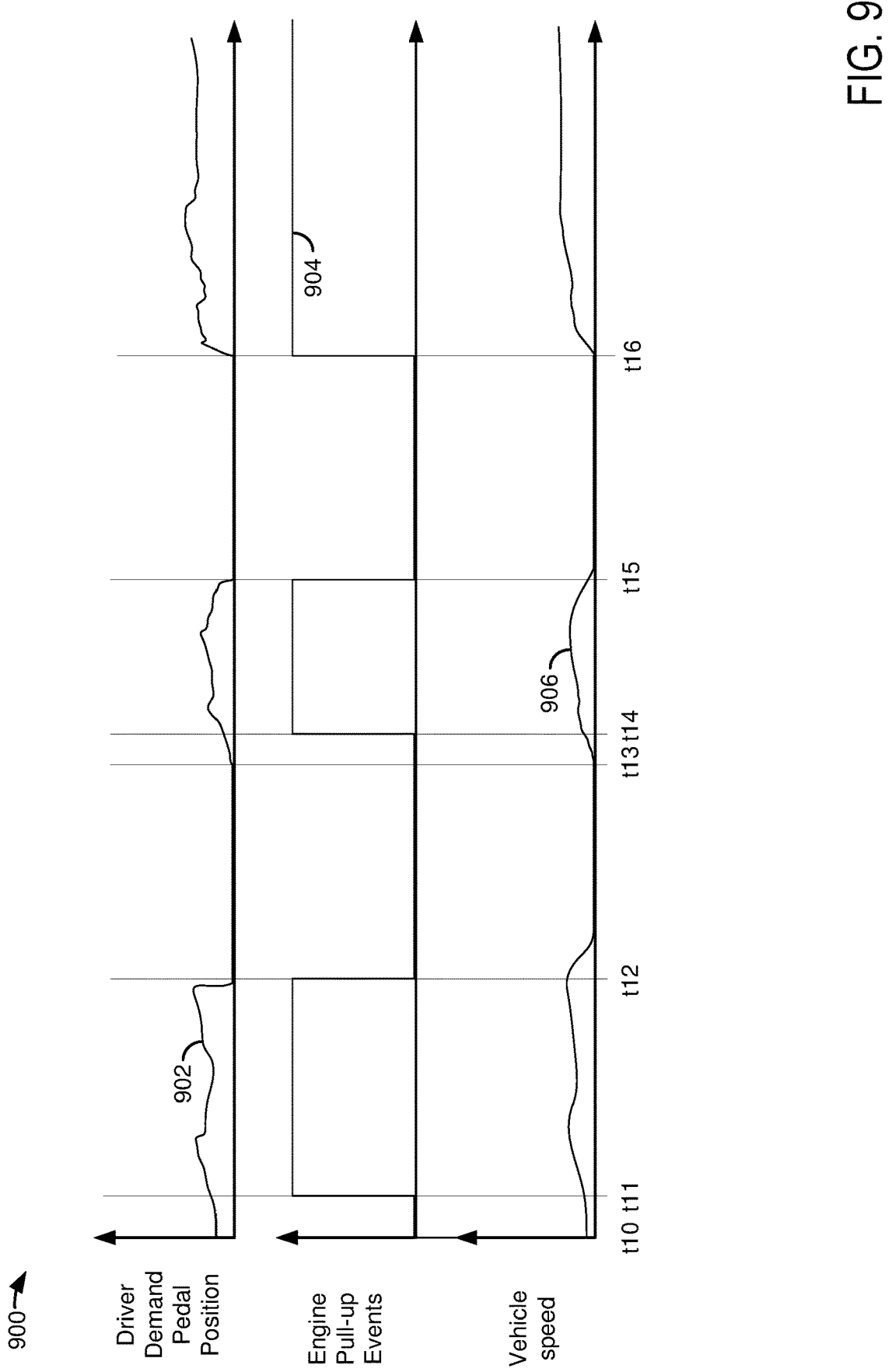

METHODS AND SYSTEM TO PREPARE A DISCONNECT CLUTCH FOR STARTING AN ENGINE

CROSS REFERENCE TO RELATED APPLICATION

The present application is a divisional of U.S. Non-Provisional patent application Ser. No. 17/547,121, entitled "METHODS AND SYSTEM TO PREPARE A DISCONNECT CLUTCH FOR STARTING AN ENGINE", and filed on Dec. 9, 2021. The entire contents of the above-listed application are hereby incorporated by reference for all purposes.

FIELD

The present description relates to methods and a system for preparing a driveline disconnect clutch for starting an engine of a hybrid vehicle.

BACKGROUND AND SUMMARY

A hybrid vehicle may include a driveline disconnect clutch that is positioned between an internal combustion engine and an electric machine. The driveline disconnect clutch may be open during conditions of low driver demand so that the engine may be stopped to conserve fuel. The driveline disconnect clutch may be closed during higher driver demand conditions so that the engine may provide power to meet the driver demand. The driveline disconnect clutch may also take part during some engine starting procedures. For example, if the driver demand torque or power level increases quickly, a higher urgency engine start may be requested and the driveline disconnect clutch may be closed to transfer torque from an electric machine to start the engine. However, the driveline disconnect clutch may not close instantaneously because of actuator delays and other factors. Therefore, it may be beneficial to provide a way of starting the engine via reducing an amount of time it takes to close a driveline disconnect clutch.

The inventors herein have recognized the above-mentioned issues and have developed a method for starting an engine, comprising: increasing a driveline disconnect clutch line pressure in response to a vehicle state being within a threshold range, where the threshold range is based on a number of engine starts performed via a driveline disconnect clutch and the vehicle state.

By increasing a driveline disconnect clutch line pressure in response to a vehicle state being within a threshold range, it may be possible to provide the technical result of reducing a starting time of an engine. In particular, the driveline disconnect clutch pressure may be held at an elevated level in anticipation that an engine start may be requested. Increasing the driveline disconnect clutch line pressure before an engine start is requested, may allow the driveline disconnect clutch to close sooner after an engine start is requested since less time may be needed to build driveline disconnect clutch line pressure.

The present description may provide several advantages. In particular, the approach may reduce engine starting time. Further, the approach may improve vehicle drivability. In addition, the approach may be adjusted to suit individual driving styles.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where:

FIG. 9 shows an example historical vehicle operating sequence.

DETAILED DESCRIPTION

Figure 1:
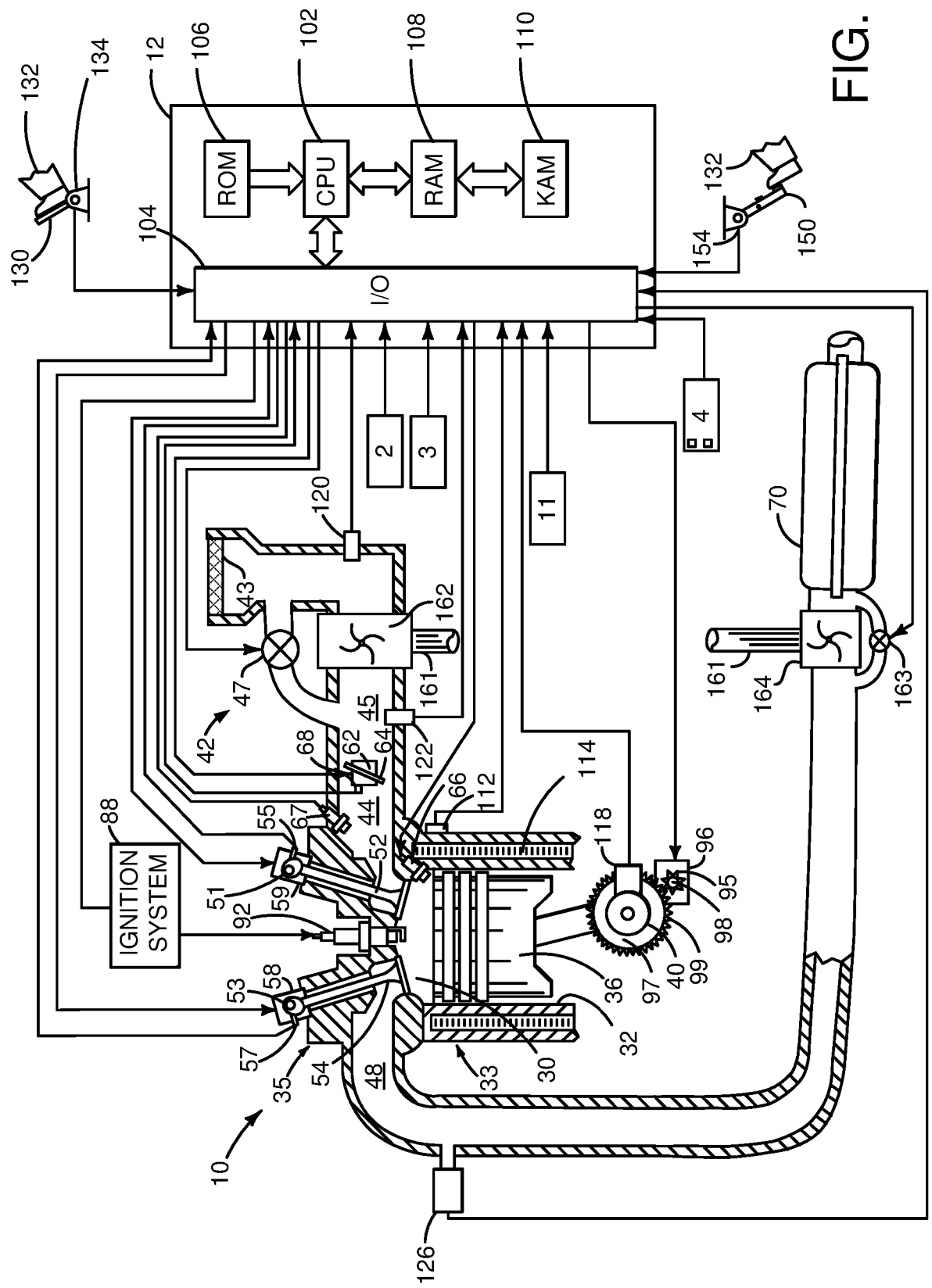
FIG. 1 is a schematic diagram of an engine.
Figure 2:
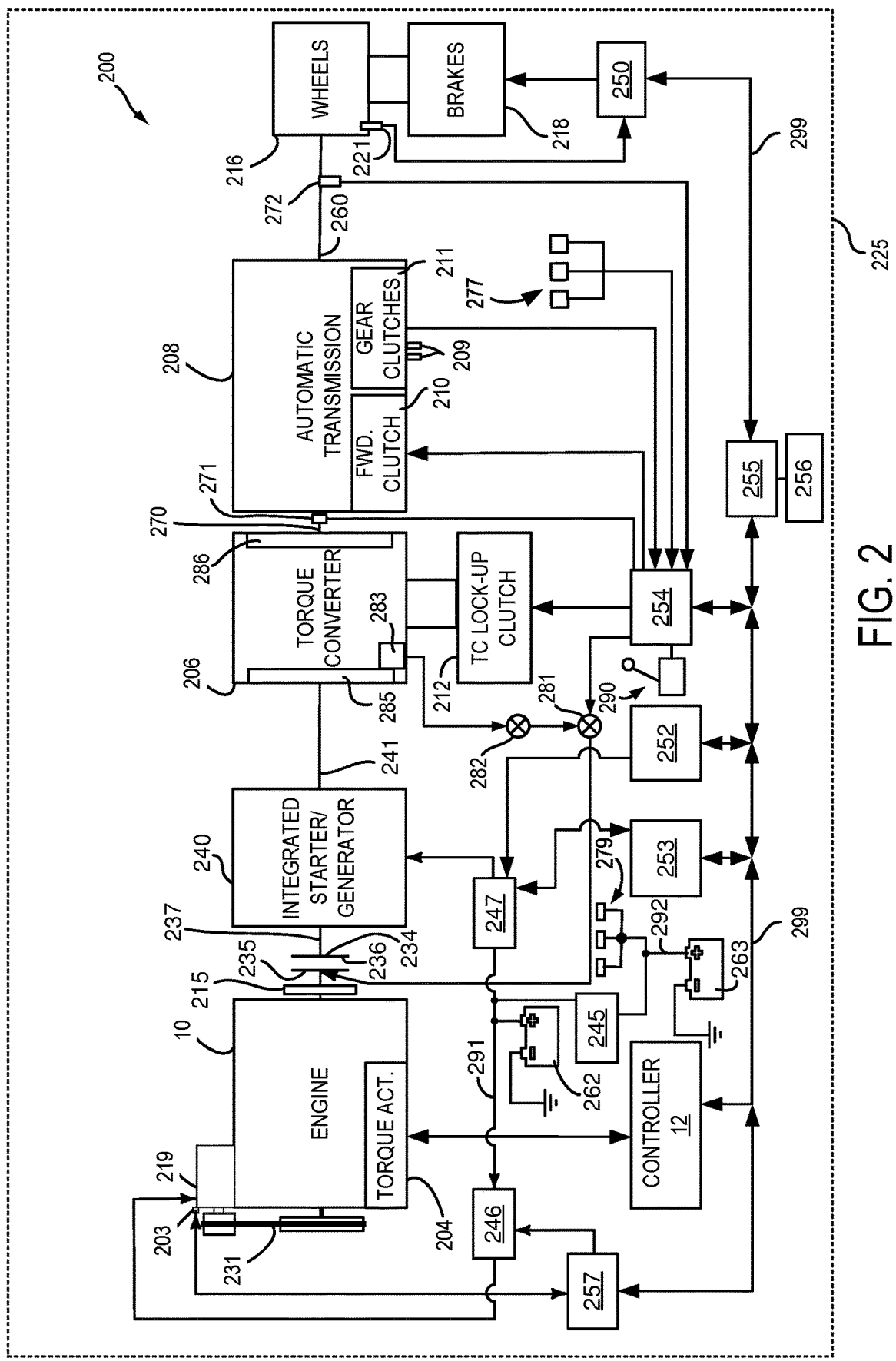
FIG. 2 is a schematic diagram of a vehicle driveline.
Figure 4:
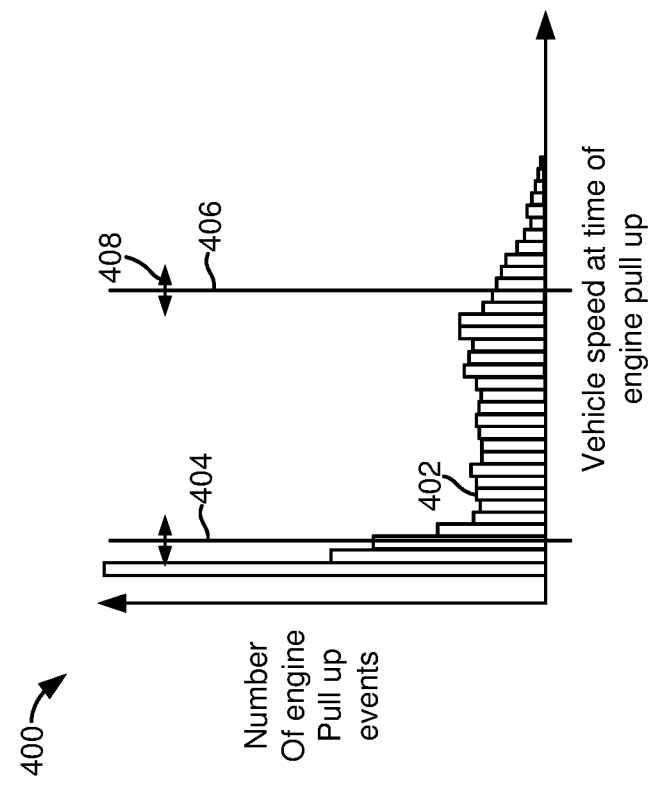
FIGS. 3 and 4 show example thresholds for anticipating or predicting engine starting that are based on vehicle operating conditions during engine starting.
Figure 3:
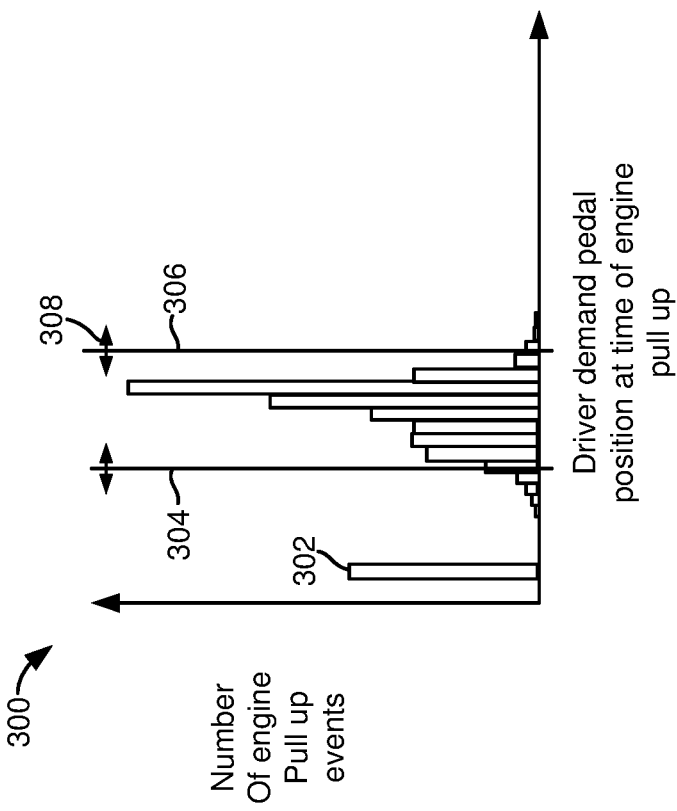
Figure 6:
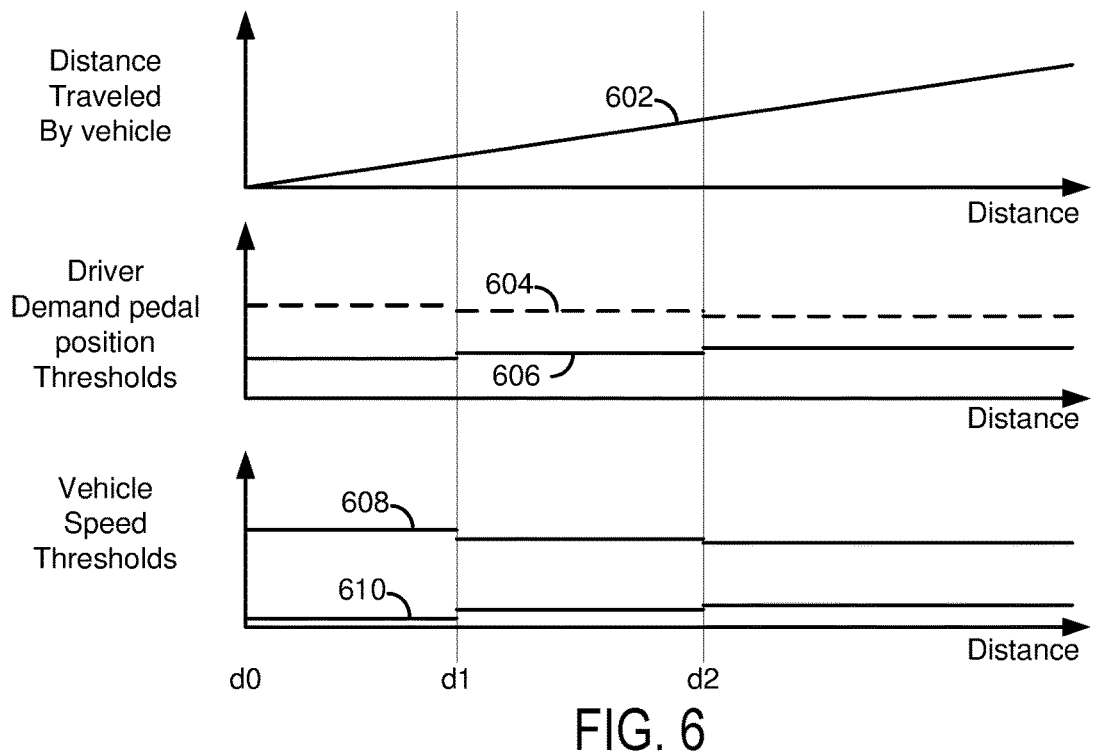
FIGS. 6 and 7 show plots of vehicle operation according to the method of FIG. 5.
Figure 7:
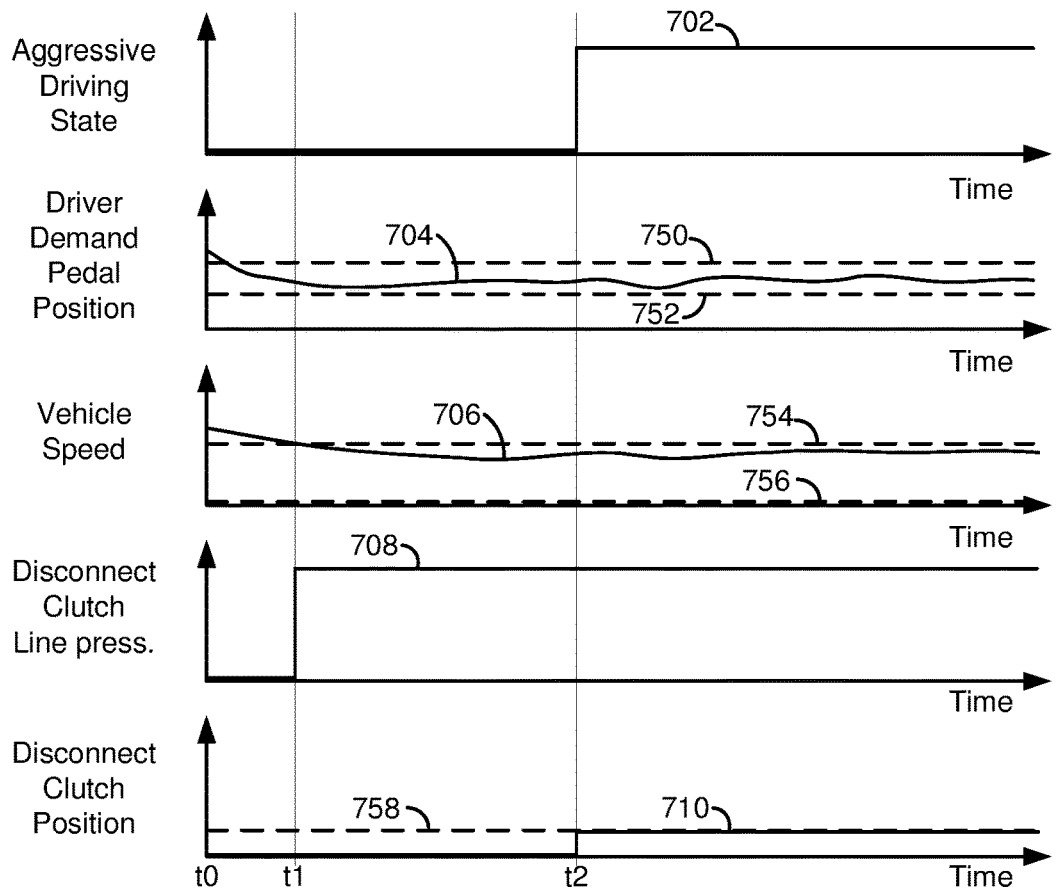
Figure 8:
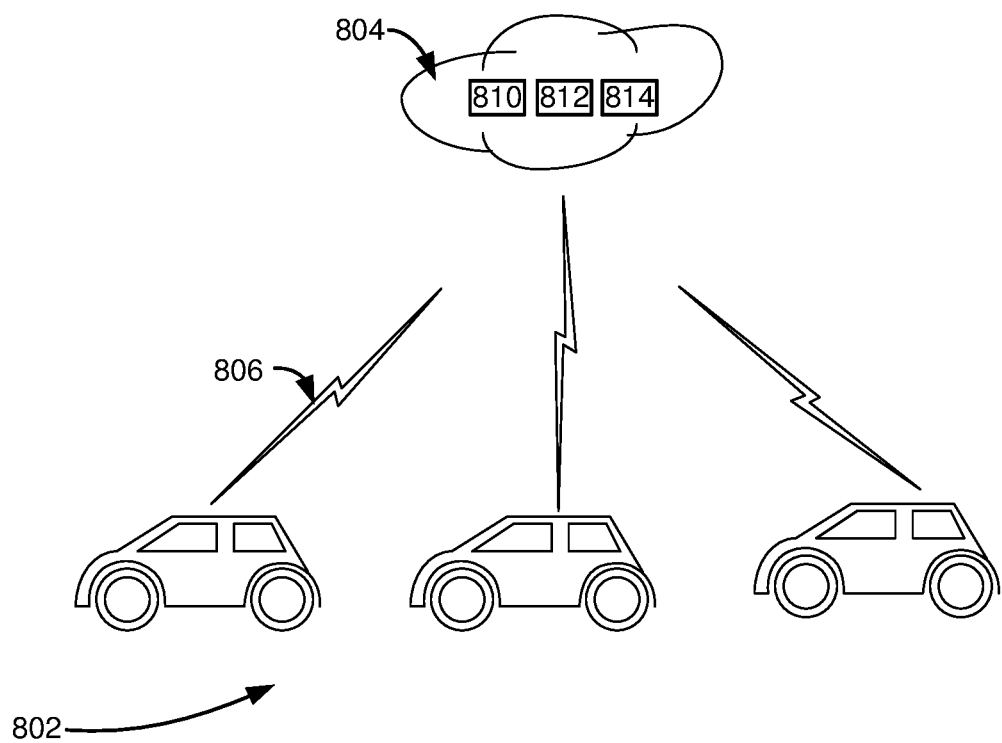
FIG. 8 is a sketch that illustrates how data may be collected for determining thresholds for anticipating or predicting engine starting.

The present description is related to preparing a driveline disconnect clutch for a potential engine start. The driveline disconnect clutch may be operated such that less time may be needed to close the driveline disconnect clutch if an engine start or pull-up is requested. Closing the driveline disconnect clutch sooner may allow the engine to be cranked by an electric machine sooner. The driveline disconnect clutch may be coupled to an engine of the type that is shown in FIG. 1. The engine may be included in a driveline as shown in FIG. 2. The driveline disconnect clutch may be operated according to thresholds that are based on prior engine starting events as shown in FIGS. 3 and 4. The driveline disconnect clutch and driveline may be operated according to the method of FIG. 5. The driveline disconnect clutch may operate according to the method of FIG. 5 as shown in the sequences of FIGS. 6 and 7. The driveline disconnect clutch may operate according to thresholds that are based on data from a plurality of vehicles as shown in FIG. 8. Finally, an example historical vehicle operating sequence is shown in FIG. 9.

Referring to FIG. 1, internal combustion engine 10, comprising a plurality of cylinders, one cylinder of which is shown in FIG. 1, is controlled by electronic engine controller 12. The controller 12 receives signals from the various sensors shown in FIGS. 1 and 2. The controller employs the actuators shown in FIGS. 1 and 2 to adjust engine and driveline or powertrain operation based on the received signals and instructions stored in memory of controller 12.

Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Optional starter 96 (e.g., low voltage (operated with less than 30 volts) electric machine) includes pinion shaft 98 and pinion gear 95. Pinion shaft 98 may selectively advance pinion gear 95 to engage ring gear 99. Optional starter 96 may be directly mounted to the front of the engine or the rear of the engine. In some examples, starter 96 may selectively supply power to crankshaft 40 via a belt or chain. In addition, starter 96 is in a base state when not engaged to the engine crankshaft 40 and flywheel ring gear 99. Starter 96 may be referred to as a flywheel starter.

Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be electromechanical devices.

Direct fuel injector 66 is shown positioned to inject fuel directly into cylinder 30, which is known to those skilled in the art as direct injection. Port fuel injector 67 is shown positioned to inject fuel into the intake port of cylinder 30, which is known to those skilled in the art as port injection. Fuel injectors 66 and 67 deliver liquid fuel in proportion to pulse widths provided by controller 12. Fuel is delivered to fuel injectors 66 and 67 by a fuel system (not shown) including a fuel tank, fuel pump, and fuel rail (not shown).

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of three-way catalyst 70. Alternatively, a two-state exhaust gas oxygen sensor may be substituted for UEGO sensor 126.

Catalyst 70 may include multiple bricks and a three-way catalyst coating, in one example. In another example, multiple emission control devices, each with multiple bricks, can be used.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to a driver demand pedal 130 (e.g., a human/machine interface) for sensing force applied by human driver 132; a position sensor 154 coupled to brake pedal 150 (e.g., a human/machine interface) for sensing force applied by human driver 132, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

Controller 12 may also receive input from human/machine interface 11. A request to start or stop the engine or vehicle may be generated via a human and input to the human/machine interface 11. The human/machine interface 11 may be a touch screen display, pushbutton, key switch or other known device. Controller 12 may also receive navigation and global positioning system (GPS) data (e.g., locations of lights, signs, roads, etc.) from GPS receiver/navigation system 2. Controller 12 may interface with other vehicles to receive traffic data (e.g., locations of other vehicles, traffic flow, etc.) from connected vehicle interface 3. Controller 12 may receive proximity data from other vehicles via vehicle proximity sensing system 4.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft converts piston movement into a rotational power of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a powertrain or driveline 200. The powertrain of FIG. 2 includes engine 10 shown in FIG. 1. Powertrain 200 is shown including vehicle system controller 255, engine controller 12, first electric machine controller 252, second electric machine controller 257, transmission controller 254, energy storage device controller 253, and brake controller 250. The controllers may communicate over controller area network (CAN) 299. In addition, vehicle system controller 255 may communicate with communications system 256 (e.g., a transceiver) so that vehicle 225 may communicate with a remote server (not shown) via cellular network, satellites, vehicle to vehicle communications network, or other radio frequency communications system. Each of the controllers may provide information to other controllers such as power output limits (e.g., power output of the device or component being controlled not to be exceeded), power input limits (e.g., power input of the device or component being controlled not to be exceeded), power output of the device being controlled, sensor and actuator data, diagnostic information (e.g., information regarding a degraded transmission, information regarding a degraded engine, information regarding a degraded electric machine, information regarding degraded brakes). Further, the vehicle system controller 255 may provide commands to engine controller 12, electric machine controller 252, transmission controller 254, and brake controller 250 to achieve driver input requests and other requests that are based on vehicle operating conditions.

For example, in response to a driver (human or autonomous) releasing a driver demand pedal and vehicle speed, vehicle system controller 255 may request a desired wheel power or a wheel power level to provide a desired rate of vehicle speed reduction. The requested desired wheel power may be provided by vehicle system controller 255 requesting a first braking power from electric machine controller 252 and a second braking power from engine controller 12, the first and second powers providing a desired driveline braking power at vehicle wheels 216. Vehicle system controller 255 may also request a friction braking power via brake controller 250. The braking powers may be referred to as negative powers since they slow driveline and wheel rotation. Positive power may maintain or increase speed of the driveline and wheel rotation.

In other examples, the partitioning of controlling powertrain devices may be partitioned differently than is shown in FIG. 2. For example, a single controller may take the place of vehicle system controller 255, engine controller 12, first electric machine controller 252, second electric machine controller 257, transmission controller 254, and brake controller 250. Alternatively, the vehicle system controller 255 and the engine controller 12 may be a single unit while the electric machine controller 252, the transmission controller 254, and the brake controller 250 are standalone controllers.

In this example, powertrain 200 may be powered by engine 10 and electric machine 240. In other examples, engine 10 may be omitted. Engine 10 may be started with an engine starting system shown in FIG. 1, via belt integrated starter/generator BISG 219, or via driveline integrated starter/generator (ISG) 240 also known as an integrated starter/generator. A temperature of BISG 219 may be determined via optional BISG temperature sensor 203. Driveline ISG 240 (e.g., high voltage (operated with greater than 30 volts) electrical machine) may also be referred to as an electric machine, motor, and/or generator. Further, power of engine 10 may be adjusted via power actuator 204, such as a fuel injector, throttle, etc.

Driveline 200 is shown to include a belt integrated starter/generator (ISG) 219. ISG 219 may be coupled to crankshaft 40 of engine 10 via a belt 231. Alternatively, ISG 219 may be directly coupled to crankshaft 40. ISG 219 may provide a negative torque to driveline 200 when charging higher voltage electric energy storage device 262 (e.g., a traction battery). ISG 219 may also provide a positive torque to rotate driveline 200 via energy supplied by lower voltage electric energy storage device (e.g., a battery or capacitor) 263. In one example, electric energy storage device 262 may output a higher voltage (e.g., 48 volts) than electric energy storage device 263 (e.g., 12 volts). DC/DC converter 245 may allow exchange of electrical energy between high voltage bus 291 and low voltage bus 292. High voltage bus 291 is electrically coupled to inverter 246 and higher voltage electric energy storage device 262. Low voltage bus 292 is electrically coupled to lower voltage electric energy storage device 263 and sensors/actuators/accessories 279. Electrical accessories 279 may include but are not limited to front and rear windshield resistive heaters, vacuum pumps, climate control fans, and lights. Inverter 246 converts DC power to AC power and vice-versa to enable power to be transferred between ISG 219 and electric energy storage device 262. Likewise, inverter 247 converts DC power to AC power and vice-versa to enable power to be transferred between ISG 240 and electric energy storage device 262.

An engine output power may be transmitted to an input or first side of driveline disconnect clutch 235 through dual mass flywheel 215. Driveline disconnect clutch 236 may be hydraulically actuated via fluid (e.g., oil) that is pressurized via pump 283. A position of valve 282 (e.g., line pressure control valve) may be modulated to control a pressure (e.g., a line pressure) of fluid that may be supplied to driveline disconnect clutch pressure control valve 281. A position of valve 281 may be modulated to control a pressure of fluid that is supplied to driveline disconnect clutch 235. The downstream or second side 234 of disconnect clutch 236 is shown mechanically coupled to ISG input shaft 237.

ISG 240 may be operated to provide power to powertrain 200 or to convert powertrain power into electrical energy to be stored in electric energy storage device 262 in a regeneration mode. ISG 240 is in electrical communication with energy storage device 262. ISG 240 has a higher output power capacity than starter 96 shown in FIG. 1 or BISG 219. Further, ISG 240 directly drives powertrain 200 or is directly driven by powertrain 200. There are no belts, gears, or chains to couple ISG 240 to powertrain 200. Rather, ISG 240 rotates at the same rate as powertrain 200. Electrical energy storage device 262 (e.g., high voltage battery or power source) may be a battery, capacitor, or inductor. The downstream side of ISG 240 is mechanically coupled to the impeller 285 of torque converter 206 via shaft 241. The upstream side of the ISG 240 is mechanically coupled to the disconnect clutch 236. ISG 240 may provide a positive power or a negative power to powertrain 200 via operating as a motor or generator as instructed by electric machine controller 252.

Torque converter 206 includes a turbine 286 to output power to input shaft 270. Input shaft 270 mechanically couples torque converter 206 to automatic transmission 208. Torque converter 206 also includes a torque converter bypass lock-up clutch 212 (TCC). Power is directly transferred from impeller 285 to turbine 286 when TCC is locked. TCC is electrically operated by controller 254. Alternatively, TCC may be hydraulically locked. In one example, the torque converter may be referred to as a component of the transmission.

When torque converter lock-up clutch 212 is fully disengaged, torque converter 206 transmits engine power to automatic transmission 208 via fluid transfer between the torque converter turbine 286 and torque converter impeller 285, thereby enabling torque multiplication. In contrast, when torque converter lock-up clutch 212 is fully engaged, the engine output power is directly transferred via the torque converter clutch to an input shaft 270 of transmission 208. Alternatively, the torque converter lock-up clutch 212 may be partially engaged, thereby enabling the amount of power directly transferred to the transmission to be adjusted. The transmission controller 254 may be configured to adjust the amount of power transmitted by torque converter 212 by adjusting the torque converter lock-up clutch in response to various engine operating conditions, or based on a driver-based engine operation request.

Torque converter 206 also includes pump 283 that pressurizes fluid to operate disconnect clutch 236, forward clutch 210, and gear clutches 211. Pump 283 is driven via impeller 285, which rotates at a same speed as ISG 240.

Automatic transmission 208 includes gear clutches (e.g., gears 1-10) 211 and forward clutch 210. Automatic transmission 208 is a fixed ratio transmission. Alternatively, transmission 208 may be a continuously variable transmission that has a capability of simulating a fixed gear ratio transmission and fixed gear ratios. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Power output from the automatic transmission 208 may also be relayed to wheels 216 to propel the vehicle via output shaft 260. Specifically, automatic transmission 208 may transfer an input driving power at the input shaft 270 responsive to a vehicle traveling condition before transmitting an output driving power to the wheels 216. Transmission controller 254 selectively activates or engages TCC 212, gear clutches 211, and forward clutch 210. Transmission controller also selectively deactivates or disengages TCC 212, gear clutches 211, and forward clutch 210.

A frictional force may be applied to wheels 216 by engaging friction wheel brakes 218. In one example, friction wheel brakes 218 may be engaged in response to a human driver pressing their foot on a brake pedal (not shown) and/or in response to instructions within brake controller 250. Further, brake controller 250 may apply brakes 218 in response to information and/or requests made by vehicle system controller 255. In the same way, a frictional force may be reduced to wheels 216 by disengaging wheel brakes 218 in response to the human driver releasing their foot from a brake pedal, brake controller instructions, and/or vehicle system controller instructions and/or information. For example, vehicle brakes may apply a frictional force to wheels 216 via controller 250 as part of an automated engine stopping procedure. A braking torque may be determined as a function of brake pedal position.

In response to a request to increase a speed of vehicle 225, vehicle system controller may obtain a driver demand power or power request from a driver demand pedal or other device. Vehicle system controller 255 then allocates a fraction of the requested driver demand power to the engine and the remaining fraction to the ISG or BISG. Vehicle system controller 255 requests the engine power from engine controller 12 and the ISG power from electric machine controller 252. If the ISG power plus the engine power is less than a transmission input power limit (e.g., a threshold value not to be exceeded), the power is delivered to torque converter 206 which then relays at least a fraction of the requested power to transmission input shaft 270. Transmission controller 254 selectively locks torque converter clutch 212 and engages gears via gear clutches 211 in response to shift schedules and TCC lockup schedules that may be based on input shaft power and vehicle speed. In some conditions when it may be desired to charge electric energy storage device 262, a charging power (e.g., a negative ISG power) may be requested while a non-zero driver demand power is present. Vehicle system controller 255 may request increased engine power to overcome the charging power to meet the driver demand power.

In response to a request to reduce a speed of vehicle 225 and provide regenerative braking, vehicle system controller may provide a negative desired wheel power (e.g., desired or requested powertrain wheel power) based on vehicle speed and brake pedal position. Vehicle system controller 255 then allocates a fraction of the negative desired wheel power to the ISG 240 and the engine 10. Vehicle system controller may also allocate a portion of the requested braking power to friction brakes 218 (e.g., desired friction brake wheel power). Further, vehicle system controller may notify transmission controller 254 that the vehicle is in regenerative braking mode so that transmission controller 254 shifts gears 211 based on a unique shifting schedule to increase regeneration efficiency. Engine 10 and ISG 240 may supply a negative power to transmission input shaft 270, but negative power provided by ISG 240 and engine 10 may be limited by transmission controller 254 which outputs a transmission input shaft negative power limit (e.g., not to be exceeded threshold value). Further, negative power of ISG 240 may be limited (e.g., constrained to less than a threshold negative threshold power) based on operating conditions of electric energy storage device 262, by vehicle system controller 255, or electric machine controller 252. Any portion of desired negative wheel power that may not be provided by ISG 240 because of transmission or ISG limits may be allocated to engine 10 and/or friction brakes 218 so that the desired wheel power is provided by a combination of negative power (e.g., power absorbed) via friction brakes 218, engine 10, and ISG 240.

Accordingly, power control of the various powertrain components may be supervised by vehicle system controller 255 with local power control for the engine 10, transmission 208, electric machine 240, and brakes 218 provided via engine controller 12, electric machine controller 252, transmission controller 254, and brake controller 250.

As one example, an engine power output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine power output by controlling a combination of fuel pulse width, fuel pulse timing, and air charge. Engine braking power or negative engine power may be provided by rotating the engine with the engine generating power that is insufficient to rotate the engine. Thus, the engine may generate a braking power via operating at a low power while combusting fuel, with one or more cylinders deactivated (e.g., not combusting fuel), or with all cylinders deactivated and while rotating the engine. The amount of engine braking power may be adjusted via adjusting engine valve timing. Engine valve timing may be adjusted to increase or decrease engine compression work. Further, engine valve timing may be adjusted to increase or decrease engine expansion work. In all cases, engine control may be performed on a cylinder-by-cylinder basis to control the engine power output.

Electric machine controller 252 may control power output and electrical energy production from ISG 240 by adjusting current flowing to and from field and/or armature windings of ISG as is known in the art.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft rate of speed change. Transmission controller 254, engine controller 12, and vehicle system controller 255, may also receive addition transmission information from sensors 277, which may include but are not limited to pump output line pressure sensors, transmission hydraulic pressure sensors (e.g., gear clutch fluid pressure sensors), ISG temperature sensors, and BISG temperatures, gear shift lever sensors, and ambient temperature sensors. Transmission controller 254 may also receive requested gear input from gear shift selector 290 (e.g., a human/machine interface device). Gear shift selector 290 may include positions for gears 1-N (where N is an upper gear number), D (drive), and P (park).

Brake controller 250 receives wheel speed information via wheel speed sensor 221 and braking requests from vehicle system controller 255. Brake controller 250 may also receive brake pedal position information from brake pedal sensor 154 shown in FIG. 1 directly or over CAN 299. Brake controller 250 may provide braking responsive to a wheel power command from vehicle system controller 255. Brake controller 250 may also provide anti-lock and vehicle stability braking to improve vehicle braking and stability. As such, brake controller 250 may provide a wheel power limit (e.g., a threshold negative wheel power not to be exceeded) to the vehicle system controller 255 so that negative ISG power does not cause the wheel power limit to be exceeded. For example, if controller 250 issues a negative wheel power limit of 50 N-m, ISG power is adjusted to provide less than 50 N-m (e.g., 49 N-m) of negative power at the wheels, including accounting for transmission gearing.

Thus, the system of FIGS. 1 and 2 provides for a system, comprising: an internal combustion engine; an electric machine; a driveline disconnect clutch coupled to the internal combustion engine; and a controller including executable instructions stored in non-transitory memory that cause the controller to stroke the driveline disconnect clutch while a vehicle is engaged in a first vehicle operating mode, the internal combustion engine is stopped, and an engine start is not requested, and to not stroke the driveline disconnect clutch while the vehicle is engaged in a second vehicle operating mode, the internal combustion engine is stopped, and the engine start is not requested. The system includes where the first vehicle operating mode is an enhanced performance mode. The system includes where the second operating mode is an economy mode. The system further comprises additional instructions to adjust thresholds for anticipating or predicting engine starting based on an actual number of engine starts performed via closing the driveline disconnect clutch and a position of a driver demand pedal. The system further comprises additional instructions to adjust thresholds for anticipating or predicting engine starting based on an actual number of engine starts performed via closing the driveline disconnect clutch and a vehicle speed. The system includes where adjusting the thresholds for anticipating or predicting engine starting includes adjusting the thresholds for anticipating or predicting engine starting according to a characteristic of a distribution. The system further comprises additional instructions to increase a driveline disconnect clutch line pressure while the vehicle is engaged in the second vehicle operating mode while the internal combustion engine is stopped.

Referring now to FIG. 3, a plot of a relationship between an actual total number of engine pull-up events (e.g., automatic engine starts where the engine is started via a controller responsive to vehicle operating conditions) and a drive demand pedal position is shown. The vertical axis represents an actual total number of engine pull-up events. The horizontal axis represents driver demand pedal position and driver demand pedal position increases in the direction of the horizontal axis arrow.

FIG. 3 presents the actual total number of engine pull-ups versus driver demand pedal position in a histogram format. Alternatively, driver demand torque or power may be substituted for driver demand pedal position. Data bars running along the horizontal axis represent an actual total number of engine pull-up events for a driver demand pedal position. For example, data bar 302 represents a middle level number of engine pull-up events (e.g., 50 engine pull-up events where an engine is started for each engine pull-up event) while the driver demand pedal is positioned slightly off its base position (e.g., 10% of full scale driver demand pedal position), where the base position of the driver demand pedal is the vertical axis. In this example, the data bars that are positioned between lower driver demand pedal position threshold 304 and upper driver demand pedal position threshold 306 follow a near normal distribution with a bell shaped appearance. The data bars 302 may also be referred to as bins or driver demand pedal position bins, where each bin has a height that reflects the number of engine pull-up events for a particular driver demand pedal position. The total number of engine pull-up events may be placed into a predetermined number of bins that may provide a shape to the data distribution. In the example of FIG. 3, seventeen bins are shown and the seventeen bins include the total number of engine pull-up events.

The upper and lower driver demand pedal position thresholds 304 and 306 may move relative to the driver demand pedal position axis as indicated at arrow 308. The upper and lower driver demand pedal position thresholds 304 and 306 may be adjusted for an individual human driver's driving characteristics. The area or region between threshold 304 and threshold 306 may be referred to as an in range area or region where an engine pull-up event is predicted to be likely. The area or region to the left of threshold 304 is an area where an engine pull-up event is predicted to be unlikely. The area or region to the right of threshold 306 is an area where an engine pull-up event is predicted to be unlikely. Thus, the areas or regions to the left of threshold 304 and to the right of threshold 306 may be referred to as out of range regions for engine pull-up events. Thresholds 304 and 306 may be referred to as thresholds for anticipating or predicting engine pull-up or starting.

Turning now to FIG. 4, a plot of a relationship between an actual total number of engine pull-up events and vehicle speed is shown. The vertical axis represents an actual total number of engine pull-up events. The horizontal axis represents vehicle speed and vehicle speed increases in the direction of the horizontal axis arrow.

FIG. 4 presents the actual total number of engine pull-ups versus vehicle speed in a histogram format. Data bars running along the horizontal axis represent an actual total number of engine pull-up events for a vehicle speed. For example, data bar 402 represents a lower level number of engine pull-up events (e.g., 20 engine pull-up events where an engine is started for each engine pull-up event) while the vehicle speed is a lower vehicle speed (e.g., 30 kilometers/hour). In this example, the data bars that are positioned between lower vehicle speed threshold 404 and upper vehicle speed threshold 406 follow a somewhat uniform distribution with a rectangular shaped appearance. The data bars 402 may also be referred to as bins or vehicle speed bins, where each bin has a height that reflects the number of engine pull-up events for a particular vehicle speed. The total number of engine pull-up events may be placed into a predetermined number of bins that may provide a shape to the data distribution. In the example of FIG. 4, thirty four bins are shown and the thirty four bins include the total number of engine pull-up events.

The upper and lower vehicle speed thresholds 404 and 406 may move relative to the vehicle speed axis as indicated at arrow 408. The upper and lower vehicle speed thresholds 404 and 406 may be adjusted for an individual human driver's driving characteristics. The area or region between threshold 404 and threshold 406 may be referred to as an in range area or region where an engine pull-up event is predicted to be likely. The area or region to the left of threshold 404 is an area where an engine pull-up event is predicted to be unlikely. The area or region to the right of threshold 406 is an area where an engine pull-up event is predicted to be unlikely. Thus, the areas or regions to the left of threshold 404 and to the right of threshold 406 may be referred to as out of range regions for engine pull-up events. Thresholds 404 and 406 may be referred to as thresholds for anticipating or predicting engine pull-up or starting.

Figure 5:
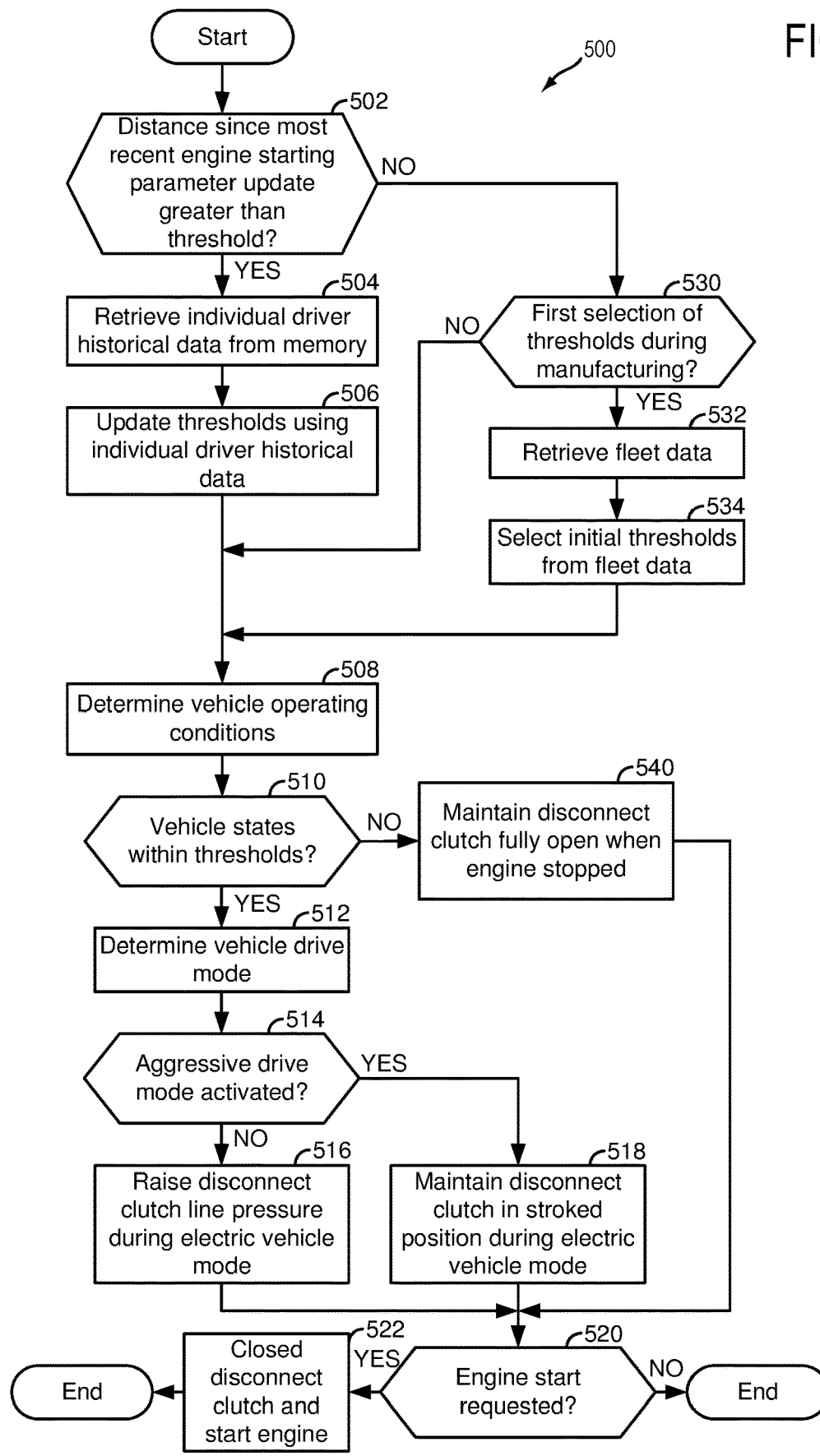
FIG. 5 shows an example method for preparing a driveline disconnect clutch for engine starting.

Referring now to FIG. 5, a flowchart of a method for preparing a driveline disconnect clutch for engine starting is shown. The method of FIG. 5 may be incorporated into and may cooperate with the system of FIGS. 1-2. Further, at least portions of the method of FIG. 5 may be incorporated as executable instructions stored in non-transitory memory while other portions of the method may be performed via a controller transforming operating states of devices and actuators in the physical world. Portions of the method of FIG. 5 may be performed when an engine of a vehicle in which the engine resides is not rotating and combusting air and fuel and when a driveline disconnect clutch is fully open and not transferring torque.

At 502, method 500 judges if a distance that a vehicle has traveled since a most recent update to engine starting parameters is greater than a threshold distance. If so, the answer is yes and method 500 proceeds to 504. Otherwise, the answer is no and method 500 proceeds to 530. For example, if a vehicle has traveled a total of 500 kilometers since it was manufactured and the threshold distance is 500 kilometers, the answer is yes and method 500 proceeds to 504. In another example, if engine starting parameters were mostly recently updated when the vehicle had traveled 2500 kilometers since being manufactured, the vehicle has traveled 500 kilometers since the engine starting parameters were most recently updated, and the threshold distance is 500 kilometers, the answer is yes and method 500 proceeds to 504.

At 504, method 500 retrieves individual driver historical data. The historical data may include vehicle operating conditions during which engine pull-ups were performed as shown in FIG. 9. In addition, the historical data may be retrieved from controller memory or from a remote cloud server as is illustrated in FIG. 8. In some examples, the historical data may be processed via the remote cloud server as described at 506, and the remote cloud server may transmit adjustments to the thresholds for anticipating or predicting engine starting described herein that may be a basis for predicting or anticipating engine pull-ups. Method 500 proceeds to 506.

At 506, method 500 adjusts the lower driver demand pedal position threshold and the upper driver demand pedal position threshold as shown in FIG. 3. In addition, method 500 adjusts the lower vehicle speed threshold and the upper vehicle speed threshold as shown in FIG. 4.

The lower driver demand pedal position threshold and the upper driver demand pedal position threshold may be adjusted to driver demand pedal positions from the individual driver data or from the cloud data that are predetermined standard deviation distances from the mean driver demand pedal position for engine pull-ups as determined from historical vehicle data. In other examples, the lower driver demand pedal position threshold and the upper driver demand pedal position threshold may be adjusted to driver demand pedal positions that are based on other statistical metrics or attributes of the distributions. For example, the lower driver demand pedal position threshold may be adjusted to a lowest value driver demand pedal position where the actual number of engine pull-up events exceeds a threshold value for a predetermined number of driver demand pedal position bins. The upper driver demand pedal position threshold may be adjusted to a highest value driver demand pedal position where the actual number of engine pull-up events falls below a threshold value for a predetermined number of driver demand pedal position bins.

Likewise, the lower vehicle speed threshold and the upper vehicle speed threshold may be adjusted to vehicle speeds from the individual driver data or from the cloud data that are predetermined standard deviation distances from the mean vehicle speed for engine pull-ups as determined from historical vehicle data. In other examples, the lower vehicle speed threshold and the upper vehicle speed threshold may be adjusted to vehicle speeds that are based on other statistical metrics or attributes of the distributions. For example, the lower vehicle speed threshold may be adjusted to a lowest value vehicle speed where the actual number of engine pull-up events exceeds a threshold value for a predetermined number of vehicle speed bins. The upper vehicle speed threshold may be adjusted to a highest vehicle speed where the actual number of engine pull-up events falls below a threshold value for a predetermined number of vehicle speed bins. Method 500 proceeds to 508.

At 508, method 500 determines vehicle operating conditions or states. In particular, method 500 may determine vehicle speed, driver demand pedal position, and other variables that may influence when an engine pull-up occurs. Method 500 may determine the vehicle operating conditions from the various vehicle sensors. Method 500 proceeds to 510.

At 510, method 500 judges if the vehicle operating conditions are within the thresholds that are updated at 506. If so, the answer is yes and method 500 proceeds to 512. If not, the answer is no and method 500 proceeds to 540. For example, if the present driver demand pedal position is 15% of full scale, the lower driver demand pedal position threshold is 10% of full scale, and the upper driver demand pedal position threshold is 25% of full scale, the answer is yes and method 500 may proceed to 512 provided any remaining vehicle states are within their respective thresholds.

At 512, method 500 determines a vehicle operating mode. The vehicle may include several user (e.g., human) selected vehicle operating modes that may adjust vehicle operation for vehicle driving conditions. For example, the vehicle may include "track," "sport," "economy," "off-road," and "hill descent" modes. Each mode may include unique transmission shift schedules (e.g., vehicle speeds and engine loads where the transmission shifts), vehicle suspension settings (e.g., stiff and touring (smooth)), engine adjustments (e.g., different spark timings, fuel injection timing, cam timings, etc.), and electric machine adjustments (e.g., torque output limits, speed limits, etc.). Method 500 may determine the selected vehicle operating mode according to input received from a human/machine interface. Method 500 proceeds to 514 after the vehicle operating mode is determined.

At 514, method 500 judges if an aggressive vehicle drive mode or enhanced performance mode is activated. Aggressive drive modes may include "track," "off road," and "sport." In addition, other vehicle operating modes where vehicle operating parameters are such that they increase vehicle performance over a "base" performance level may be considered "aggressive" modes. If method 500 judges that the vehicle is operating in an "aggressive" drive mode, the answer is yes and method 500 proceeds to 518. Otherwise, the answer is no and method 500 proceeds to 516 when the vehicle is operating in an economy or base performance mode. An engaged "aggressive" vehicle drive mode may tend to cause the vehicle's engine to be started sooner due to vehicle operating conditions as compared to when the "aggressive" mode is not engaged.

At 516, method 500 increases driveline disconnect clutch line pressure of fluid that is supplied to the driveline disconnect clutch, but the driveline disconnect clutch is not stroked as described at 518. By increasing the driveline disconnect clutch line pressure, the amount of time to close the driveline disconnect clutch may be reduced since the driveline disconnect clutch line pressure may be raised to a level at which the driveline disconnect clutch may be closed. Accordingly, little if any time may be needed to increase driveline disconnect clutch line pressure when the driveline disconnect clutch is commanded to closed based on an engine start request. The driveline disconnect clutch line pressure may be raised from a low line pressure (e.g., less than kilopascals) to a higher line pressure (e.g., greater than 200 kilopascals) when the driveline disconnect clutch line pressure is raised. Raising the driveline disconnect clutch line pressure may reduce the amount of time it takes to close the driveline disconnect clutch and restart the engine at the expense of a small reduction in fuel economy, but selecting an "aggressive" mode may be indicative of a vehicle operator's intent to prioritize vehicle performance. Method 500 proceeds to 520.

At 520, method 500 judges if an engine pull-up or start is requested. An engine pull-up may be automatically requested via a vehicle controller. If method 500 judges that an engine pull-up or start is requested, the answer is yes and method 500 proceeds to 522. Otherwise, the answer is no and method 500 proceeds to exit.

At 522, method 500 closes the driveline disconnect clutch and starts the engine by supplying spark and fuel to the engine. Closing the driveline disconnect clutch allows an electric machine (e.g., 240) to rotate the engine while the vehicle is stopped or moving. The engine may be started while the electric machine is also supplying torque to propel the vehicle. Method 500 proceeds to exit.

At 518, method 500 adjusts the driveline disconnect clutch to a stroked position while the vehicle is operating in electric vehicle mode (e.g., the electric machine is the only power source supplying the vehicle with propulsive effort at the present time). To operate the driveline disconnect clutch in the stroked position, the driveline disconnect clutch line pressure is increased to a higher level such that the driveline disconnect clutch may be fully closed at the raised driveline disconnect clutch line pressure. In addition, the driveline disconnect clutch actuator is adjusted such that the driveline disconnect clutch is about to transfer torque (e.g., the actuator position is within a predetermined distance of where the driveline disconnect clutch begins to transfer torque) or is transferring less than a threshold amount of torque (e.g., a positive torque that is less than 20 Newton-meters). By stroking the driveline disconnect clutch, the amount of time to start the engine via closing the driveline disconnect clutch may be further reduced as compared to when only the driveline disconnect clutch line pressure is increased. Method 500 proceeds to 520.

At 530, method 500 judges if at the present time, the engine pull-up or starting thresholds are being installed in the vehicle controller at a time of vehicle manufacture or servicing. If method 500 judges that the engine pull-up or starting thresholds are being installed during manufacturing or service, the answer is yes and method 500 proceeds to 532. Otherwise, the answer is no and method 500 proceeds to 508.

At 532, method 500 retrieves fleet data (e.g., data from a plurality of vehicles) from a remote or cloud server. The fleet data may be retrieved via over the air transmission (e.g., cellular network, satellites, vehicle to vehicle communications, vehicle to infrastructure communications, etc.) or via the internet. The fleet data may include the individual thresholds for anticipating or predicting engine pull-up or data for determining distributions for determining the thresholds for anticipating or predicting engine pull-up. Method 500 proceeds to 534.

At 534, method 500 selects initial thresholds for anticipating or predicting engine pull-up and starting. Method 500 may activate thresholds for anticipating or predicting engine pull-up and starting that were received via a cloud server. Alternatively, method 500 may process data received from the cloud server and generate thresholds for anticipating or predicting engine pull-up from the received data. Method 500 proceeds to 508.

In this way, thresholds for anticipating or predicting engine pull-up may be adjusted so that individual driving styles may be considered. Further, the thresholds for anticipating or predicting engine pull-up may have an initial basis from a plurality of vehicles so that vehicle drivability may be as desired at the time of a vehicle is manufactured. In addition, the thresholds for anticipating or predicting engine pull-up may be augmented by driveline disconnect clutch adjustments that may be based on vehicle operating mode.

Thus, the method of FIG. 5 provides for a method for starting an engine, comprising: increasing a driveline disconnect clutch line pressure in response to a vehicle state being within a threshold range, where the threshold range is based on a number of engine starts performed via a driveline disconnect clutch and the vehicle state. The method includes where the threshold range is bounded by a lower threshold and an upper threshold. The method includes where the vehicle state is a state of a driver demand pedal position. The method includes where the vehicle state is a vehicle speed. The method includes where the driveline disconnect clutch line pressure is increased while the engine is not rotating. The method further comprises starting the engine via closing the driveline disconnect clutch. The method includes where the line pressure is increased without transferring torque across the driveline disconnect clutch. The method includes where the driveline disconnect clutch pressure is increased via adjusting a position of a valve.

The method of FIG. 5 also provides for a method for starting an engine, comprising: starting an engine according to two or more thresholds installed in a vehicle at a time of manufacture of the vehicle, the two or more thresholds based on engine starting data compiled from a plurality of vehicles, the two or more thresholds based on a number of engine starts performed via a driveline disconnect clutch and a vehicle state. The method further comprises adjusting the two or more thresholds in response to a distance a vehicle is driven. The method includes where the two or more thresholds are adjusted in further response to historical data generated while a vehicle is being driven. The method includes where the vehicle state is a driver demand. The method includes where the vehicle state is a vehicle speed.

Referring now to FIG. 6, updating of driver demand and vehicle speed thresholds according to the method of FIG. 5 and the system of FIGS. 1 and 2 is shown. FIG. 6 includes three plots. FIG. 6 also included vertical lines at distance d1 and distance d2, which are distances of interest.

The first plot from the top of FIG. 6 is a plot of a distance traveled by a vehicle since a time of manufacture of the vehicle. The vertical axis represents the distance that the vehicle has traveled since the time the vehicle was manufactured and the distance traveled by the vehicle increases in the direction of the vertical axis arrow. The horizontal axis also represents the distance that the vehicle has traveled since the time the vehicle was manufactured and the distance traveled by the vehicle increases in the direction of the horizontal axis arrow. Trace 602 represents the distance that the vehicle has traveled since its manufacture.

The second plot from the top of FIG. 6 is a plot of driver demand pedal position thresholds versus distance traveled by the vehicle since the time of manufacture of the vehicle. The vertical axis represents the driver demand pedal position and the driver demand pedal position increases in the direction of the vertical axis arrow. The horizontal axis represents the distance that the vehicle has traveled since the time the vehicle was manufactured and the distance traveled by the vehicle increases in the direction of the horizontal axis arrow. Trace 604 represents an upper driver demand pedal position threshold for engine pull-ups or starts. Trace 606 represents a lower driver demand pedal position threshold for engine pull-ups or starts.

The third plot from the top of FIG. 6 is a plot of vehicle speed thresholds versus distance traveled by the vehicle since the time of manufacture of the vehicle. The vertical axis represents the vehicle speed and the vehicle speed increases in the direction of the vertical axis arrow. The horizontal axis represents the distance that the vehicle has traveled since the time the vehicle was manufactured and the distance traveled by the vehicle increases in the direction of the horizontal axis arrow. Trace 608 represents an upper vehicle speed threshold for engine pull-ups or starts. Trace 610 represents a lower vehicle speed threshold for engine pull-ups or starts.

At distance d0, initial driver demand pedal position thresholds and vehicle speed thresholds for engine pull-ups or starts are set at levels that may be based on a plurality of vehicles. The data for the thresholds and/or the thresholds may be retrieved from a cloud or remote server. The distance increases from distance d0 to distance d1, but the driver demand pedal position thresholds and the vehicle speed thresholds remain unchanged.

At distance d1, the upper driver demand pedal position threshold is reduced and the lower driver demand pedal position threshold is increased in response to the vehicle traveling the distance from d0 to d1. These actions may be in response to historical driver data. In this example, the effect of adjusting the thresholds is to reduce the range where driver demand pedal position is used to anticipate or predict an engine pull-up so that driveline disconnect clutch line pressure and stroke may be adjusted based on a prediction of an engine pull-up. Similarly, the upper vehicle speed threshold is reduced and the lower vehicle speed threshold is increased. These actions may also be in response to historical driver data. In this example, the effect of adjusting the thresholds is to reduce the range where vehicle speed is used to anticipate or predict an engine pull-up so that driveline disconnect clutch line pressure and stroke may be adjusted based on a prediction of an engine pull-up. The distance increases from distance d1 to distance d2, but the driver demand pedal position thresholds and the vehicle speed thresholds remain unchanged.

At distance d2, the upper driver demand pedal position threshold is reduced again and the lower driver demand pedal position threshold is increased again in response to the vehicle traveling the distance from d1 to d2. These actions may be in response to historical driver data. Additionally, the upper vehicle speed threshold is reduced and the lower vehicle speed threshold is increased. These actions may also be in response to historical driver data.

In this way, the thresholds for anticipating or predicting engine pull-up may be adjusted at predetermined vehicle driving distances. By adjusting the thresholds for anticipating or predicting engine pull-up based on driving distance, sufficient data may be collected to provide meaningful updates to the thresholds.

Referring now to FIG. 7, an example sequence that shows how the method of FIG. 5 in cooperation with the system of FIGS. 1 and 2 may adjust driveline disconnect clutch line pressure and driveline disconnect clutch stroke or position. The sequence of FIG. 7 include vertical lines at time t2 and t3, which are times of interest in the sequence.

The first plot from the top of FIG. 7 is a plot of an aggressive driving state versus time. The vertical axis represents the aggressive driving state and the aggressive driving state is active or asserted when trace 702 is at a higher level near the vertical axis arrow. The aggressive driving state is not active when trace 702 is at a lower level near the horizontal axis. The horizontal axis represents time and time increases from the left side of the figure to the right side of the figure. Trace 702 represents the vehicle aggressive driving state.

The second plot from the top of FIG. 7 is a plot of driver demand pedal position versus time. The vertical axis represents driver demand pedal position and the driver demand pedal position increases (e.g., the pedal is applied further) in the direction of the vertical axis arrow. The horizontal axis represents time and time increases from the left side of the figure to the right side of the figure. Trace 704 represents the driver demand pedal position. Horizontal line 750 represents the driver demand pedal position upper threshold for engine pull-ups or starting. Horizontal line 752 represents the driver demand pedal position lower threshold for engine pull-ups or starting.

The third plot from the top of FIG. 7 is a plot of vehicle speed versus time. The vertical axis represents vehicle speed and the vehicle speed increases in the direction of the vertical axis arrow. The horizontal axis represents time and time increases from the left side of the figure to the right side of the figure. Trace 706 represents the vehicle speed. Horizontal line 754 represents the vehicle speed upper threshold for engine pull-ups or starting. Horizontal line 756 represents the vehicle speed lower threshold for engine pull-ups or starting.

The fourth plot from the top of FIG. 7 is a plot of driveline disconnect clutch line pressure versus time. The vertical axis represents driveline disconnect clutch line pressure and the driveline disconnect clutch line pressure increases in the direction of the vertical axis arrow. The horizontal axis represents time and time increases from the left side of the figure to the right side of the figure. Trace 708 represents the driveline disconnect clutch line pressure.

The fifth plot from the top of FIG. 7 is a plot of driveline disconnect clutch position versus time. The vertical axis represents driveline disconnect clutch position and the driveline disconnect clutch position increases (e.g., is applied further) in the direction of the vertical axis arrow. The horizontal axis represents time and time increases from the left side of the figure to the right side of the figure. Trace 710 represents the driveline disconnect clutch position and trace 758 represents a position where torque begins to be transferred across the driveline disconnect clutch.

At time t0, the vehicle is not in an "aggressive" mode. The driver demand pedal position is out of range of upper threshold 750 and lower threshold 752. In addition the vehicle speed is out of range of upper threshold 754 and lower threshold 756. Based on these states, an engine pull-up is not predicted or anticipated. Therefore, the driveline disconnect clutch is not stroked and the driveline disconnect clutch pressure is low. The vehicle's engine is not started and the vehicle is operating in electric vehicle mode (not shown).

At time t2, the vehicle is not in the "aggressive" mode, but the driver demand pedal position and the vehicle speed are within their respective upper and lower thresholds. Therefore, an engine pull-up may be anticipated or predicted. Accordingly, the driveline disconnect clutch line pressure is increased in anticipation of an engine pull-up. However, the driveline disconnect clutch is not stroked because the vehicle is not engaged in the "aggressive" mode. The engine is not started (not shown).

At time t3, the vehicle is switched to the "aggressive" mode, which causes the driveline disconnect clutch to be stroked to a position that is near where torque begins to transfer across the driveline disconnect clutch. The driveline disconnect clutch pressure remains elevated and the vehicle speed and driver demand pedal position remain within their respective thresholds.

Thus, driveline disconnect clutch pressure and driveline disconnect clutch stroke may be adjusted in anticipation of an engine pull-up being requested. Operating the driveline disconnect clutch in this way may reduce an amount of time for the driveline disconnect clutch to close if an engine pull-up is actually requested. As such, the driveline disconnect clutch may be prepared to close before it is actually commanded closed.

Referring now to FIG. 8, a schematic representation of how data may be accumulated to adjust engine pull-up thresholds is shown. FIG. 8 includes a plurality of vehicles 802. Each of the vehicles may upload or transfer vehicle data via a wireless link 806 (e.g., over the air cellular, satellite, or other communications means) to cloud server 804. Cloud server 804 may include random access memory 810, processor 812, and read only memory 814. Cloud server 804 may aggregate data from the plurality of vehicles to determine thresholds for predicting engine pull-ups. For example, cloud server 804 may generate upper and lower driver demand pedal position thresholds for anticipating engine pull-ups. In addition, cloud server 804 may generate upper and lower vehicle speed thresholds for anticipating engine pull-ups. Cloud server 804 may transmit these thresholds and/or vehicle data from a fleet or plurality of vehicles to a newly manufactured vehicle or a vehicle that is being serviced.

Referring now to FIG. 9, an example historical vehicle driving sequence is shown. The sequence of FIG. 9 may be generated via the system of FIGS. 1 and 2 monitoring and characterizing vehicle operation and input to the vehicle. The plots of FIG. 9 are time aligned and they begin and end at the same times. The vertical lines t10-t16 represent times of interest in the sequence.

The first plot from the top of FIG. 9 is a plot of driver demand pedal position versus time. The vertical axis represents driver demand pedal position and the driver demand pedal position increases (e.g., is applied farther) in the direction of the vertical axis arrow. The horizontal axis represents time and time increases from the left side of the plot to the right side of the plot. Trace 902 represents the driver demand pedal position.

The second plot from the top of FIG. 9 is a plot of an engine pull-up state versus time. The vertical axis represents the engine pull-up state and the engine pull-up state is asserted when trace 904 is at a higher level near the vertical axis arrow. The engine pull-up state is not asserted when trace 904 is at a lower level near the horizontal axis. The engine pull-up state may be asserted when the engine is started. The horizontal axis represents time and time increases from the left side of the plot to the right side of the plot. Trace 904 represents the engine pull-up state.

The third plot from the top of FIG. 9 is a plot of vehicle speed versus time. The vertical axis represents vehicle speed and the vehicle speed increases in the direction of the vertical axis arrow. The horizontal axis represents time and time increases from the left side of the plot to the right side of the plot. Trace 906 represents the vehicle speed.

At time t10, the driver demand is steady at a lower level and the engine is not running. The vehicle speed is low. Such conditions may be present when the vehicle is operating at a low vehicle speed.

At time t11, the driver demand pedal position has increased and the vehicle speed has increased. These increases result in an engine pull-up request being asserted. The engine is pulled-up and started shortly after time t11. The engine continues to run from time t11 to time t12.

At time t12, the engine is stopped and the engine pull-up request is withdrawn. The driver demand pedal position is low and the vehicle speed is decreasing. The vehicle stops between time t12 and time t13.

At time t13, the driver demand pedal position beings to increase and the vehicle speed begins to increase as driver demand pedal position increases. However, the engine pull-up is not requested and the vehicle operates in an electric vehicle mode.

At time t14, the driver demand pedal position and vehicle speed have increased to a level that causes the engine pull-up to be asserted. The engine is started (not shown) and the engine begins to provide power to the driveline. The driver demand pedal position is reduced and the engine pull-up request is withdrawn at time t15. The vehicle speed is reduced to zero shortly after time t15.

At time t16, the driver demand increases quickly and causing the engine pull-up to be asserted shortly thereafter. The vehicle speed increases in response to the increasing driver demand pedal position.

The driver demand pedal position and vehicle speeds at which the engine pull-up requests were made may be stored in controller memory. This data may also be uploaded to a cloud server so that the cloud server may generate driver demand pedal position and vehicle speed thresholds for anticipating engine pull-ups. In addition, this data may be used to modify similar threshold included in a vehicle to suit a particular driver's driving style.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, single cylinder, I3, I4, I5, V6, V8, V10, and V12 engines operating in natural gas, gasoline, diesel, or alternative fuel configurations could use the present description to advantage.

The invention claimed is:

1. A method for starting an engine, comprising:
starting an engine according to two or more thresholds installed in a vehicle at a time of manufacture of the vehicle, the two or more thresholds based on engine starting data compiled from a plurality of vehicles, the two or more thresholds based on an actual number of engine starts performed via a driveline disconnect clutch and a vehicle state.

2. The method of claim 1, further comprising adjusting the two or more thresholds in response to a distance a vehicle is driven.

3. The method of claim 2, where the two or more thresholds are adjusted in further response to historical data generated while a vehicle is being driven.

4. The method of claim 1, where the vehicle state is a driver demand pedal position.

5. The method of claim 1, where the vehicle state is a vehicle speed.

* * * * *